(12) United States Patent
Yamazaki

(10) Patent No.: US 6,259,825 B1
(45) Date of Patent: Jul. 10, 2001

(54) AUTO SETUP PROCESS

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/085,013

(22) Filed: May 28, 1998

(30) Foreign Application Priority Data

May 29, 1997 (JP) .................................................. 9-139914

(51) Int. Cl.$^7$ ........................................................ G06K 9/36
(52) U.S. Cl. ........................ 382/276; 358/474; 382/168; 382/319
(58) Field of Search ........................... 382/276, 168, 382/169, 171, 274, 282, 283, 299, 305, 318, 319, 258, 254; 358/453, 463, 474, 522, 532, 535, 538, 448, 455–459; 345/425, 427, 432; 348/671–672, 683; 250/559.04, 559.05, 559.06

(56) References Cited

U.S. PATENT DOCUMENTS

| | | | |
|---|---|---|---|
| 4,339,745 | * | 7/1982 | Barber et al. ......................... 382/172 |
| 4,590,606 | * | 5/1986 | Rohrer ................................. 382/137 |
| 4,856,075 | * | 8/1989 | Smith ................................... 382/270 |
| 5,012,333 | * | 4/1991 | Lee et al. .............................. 358/520 |
| 5,214,294 | * | 5/1993 | Toyofuku .......................... 250/559.05 |
| 5,295,204 | * | 3/1994 | Parulski .............................. 382/167 |
| 5,297,219 | * | 3/1994 | Weldy ................................. 382/299 |
| 5,696,848 | * | 12/1997 | Patti et al. ........................... 382/254 |
| 5,760,920 | * | 6/1998 | Lin et al. ............................. 358/457 |
| 5,768,482 | * | 6/1998 | Winter et al. ........................ 395/109 |
| 5,802,219 | * | 9/1998 | Farkas et al. ........................ 382/276 |
| 5,818,975 | * | 10/1998 | Goodwin et al. .................... 382/274 |
| 5,892,852 | * | 4/1999 | Namizuka et al. .................. 382/254 |
| 5,930,390 | * | 7/1999 | Coelho ................................ 382/168 |
| 5,956,157 | * | 9/1999 | Tai ...................................... 358/455 |

* cited by examiner

Primary Examiner—Jay Patel

(57) ABSTRACT

In an auto set up process for performing auto setup operations to automatically determine conditions for processing an image on the basis of captured images, not only is a histogram process for constructing histograms performed, but also regional processing is performed using the captured images. Both the constructed histograms and the result of the regional processing are used to calculate the conditions used for processing the image. The precision of the auto setup procedure is enhanced by using captured images, for example, prescanned images that are suitable for the respective auto setup operations. The process also permits the use of an image of medium or low resolution in the regional processing. As a result, the capacity of the image memory and the amount of calculations can be sufficiently reduced to increase the processing speed and, hence, shorten the processing time. In other words, the overall cost of the image processor that performs the auto setup procedure can be reduced.

13 Claims, 1 Drawing Sheet

AUTO SETUP PROCESS

BACKGROUND OF THE INVENTION

This invention relates to an auto setup process for automatically setting gradation, exposure and other conditions for image processing. More specifically, the invention relates to an auto setup process which executes the auto setup of a captured image photoelectrically read out, in particular a prescanned image roughly captured, by performing auto setup operations to determine an image transforming mapping such as a transformation function, a look-up table (LUT) or a transformation matrix.

In a conventional image forming apparatus such as a photographic printer, a copier, a proof printer and a plate-making apparatus, the image on a transmission original (e.g. a negative film or a reversal film) or a reflection original is projected directly onto an output medium, say, a light-sensitive material (this step is called "areal exposure") and subsequently developed to reproduce a photographic image, a copy image, a proof (pre-proof) or a press plate. Prior to exposure, the original image is photoelectrically and roughly captured with an image sensor such as a CCD, and the gradation and exposure conditions that match the output medium are determined on the basis of the roughly captured image which is commonly called a "prescanned image". However, the conventional image forming apparatus which perform areal exposure has only a limited set of parameters that can be adjusted in compliance with the determined exposure conditions. The adjustment is also limited because it must be performed evenly for all areas of the original image. Hence, it is extremely difficult to accomplish the proper adjustment for the whole part of the original image.

A technology that has recently become possible to implement with the above-described image forming apparatus is as follows. An original image is captured photoelectrically with an image reader such as a scanner having a solid-state imaging device such as a CCD so that it is converted to digital image signal. These digital image signals are then subjected to various image processing steps so as to create image data that are optimal for recording on a light-sensitive material. Using a light beam, say, a laser beam modulated in accordance with the resulting image data, the light-sensitive material is scan exposed to record the original image as a latent image. This latent image in turn, is then developed and otherwise processed to give a reproduced image.

In an image forming apparatus capable of such "digital processing" of image signals, the gradation and exposure conditions of the captured image can be adjusted on a pixel basis for the whole or part of the original image or for individual. Hence, the proper adjustment can be accomplished as finely as possible for the entire part of the original image.

The image forming apparatus that performs such "digital processing" is also adapted to effect an auto setup procedure for determining gradation, exposure and other image processing conditions under which the original image captured with an image reader such as a scanner, can be reproduced optimally on an output medium in spite of the variations in gradation, exposure and other conditions for the processing of the input image (to be captured). To this end, the required image processing conditions are automatically set from the captured image, particularly a prescanned image, as a mapping such as a transformation function, LUT or a transformation matrix. Using the thus set mapping, image data finely captured for exposure purposes. Namely, finely scanned image data, are transformed into image processed data, commonly called "as-auto setup image data".

To automatically determine the mapping such as a transformation function, LUT or a transformation matrix that transform the finely scanned image data on the basis of the prescanned image data, auto setup operations are performed. Two typical examples of such operations are as follows: one is a histogram process in which density histograms are constructed from the prescanned image data and the densities of highlights and shadows are set automatically. The other is regional processing in which the original image is split into regions and searched through the regions using the prescanned image data and quantitative image features such as representative or average values for the split regions or the whole original image, for example, LATD (large area transmittance density) are extracted, or a region having a specified quantitative image feature is searched through and extracted.

Further, referring to the auto setup operations, the image resolution suitable for processing differs from one process to another, particularly between the histogram process and the regional processing. In the histogram process which is often employed to determine the densities of highlights and shadows, an image of the highest possible resolution or an image subjected to minimal processing, for example, an image that has not been subjected to noise reduction (which, in the absence of limitations on the image memory's capacity and the processing time, is an image that is the closest possible to a finely-scanned image) is desired. On the other hand, in the regional processing which often involves determination of the representative or average values of regions or searching through a region having a specified feature value, there is a need to prevent the offsets that may occur in the representative or average values of regions or in the extraction of a region having a specified feature value on account of the noise in the image data and, in addition, the processing takes time to perform. Therefore, a noise-reduced image or an image of a medium or a low resolution, particularly one that has been reduced in resolution by noise reduction, is desirable.

However, in the auto setup operations described above, the histogram process, the regional processing and other processing are conventionally performed on the same prescanned image, namely, the prescanned image having the same resolution. Therefore, if a prescanned image of high resolution is employed with a view to performing the correct histogram process, an image memory of large capacity is required but then the overall cost and processing time are increased. In addition, the noise in the image data is not reduced by a sufficient amount to accomplish the correct regional processing. Conversely, if a noise-reduced prescanned image of a medium or a low resolution is employed in order to perform the correct regional processing, the intended regional processing can be accomplished with high efficiency. However other hand, the densities of highlights will decrease and those of shadows will increase in the histogram process, making it impossible to achieve the correct representation of gradations.

SUMMARY OF THE INVENTION

The present invention has been accomplished under these circumstances and has as an object providing an auto setup process in which auto setup operations for automatically determining an original image transforming mapping such as a transformation function, a look-up table (LUT) or a transformation matrix on the basis of a captured image. For example, a prescan are performed correctly by using captured images having resolutions that are suitable for the individual contents of the operations, such as the histogram process and the regional processing. This thereby increases the precision of the auto setup procedure. The respective operations are performed with high enough efficiency to reduce the capacity of the image memory while increasing the overall processing speed.

The stated object of the invention can be attained by an auto setup process for performing auto setup operations to determine automatically a mapping for transforming an image on the basis of captured images. Not only is a histogram preformed process for constructing histograms but also regional processing is performed using the captured images. Both the constructed histograms and the result of the regional processing are used to calculate the mapping used for transforming said image.

In a preferred embodiment, said histogram process and said regional processing are performed using said captured images as transformed to have resolutions suitable for the respective processes.

Preferably, the captured images to be used in the histogram process are either unprocessed or subjected to a first resolution transformation having no noise reducing effect. The captured images to be used in the regional processing are subjected to a second resolution transformation having a noise reducing effect.

Preferably, the captured images to be used in the histogram process have a higher resolution than the ones to be used in the regional processing.

The first resolution transformation is preferably one with no processing, involving simple thinning-out of pixels or thinning-out of pixels in a checkerboard pattern.

The second resolution transformation is preferably size reduction by averaging of n×m pixels or median processing within an n×m mask size.

The captured images are preferably prescanned images obtained by rough capturing of the image.

Preferably, the captured images are already corrected for pixel defects or pixel sensitivity.

The mapping is preferably a transformation function, a look-up table or a transformation matrix.

DETAILED DESCRIPTION OF THE INVENTION

Figure 1:
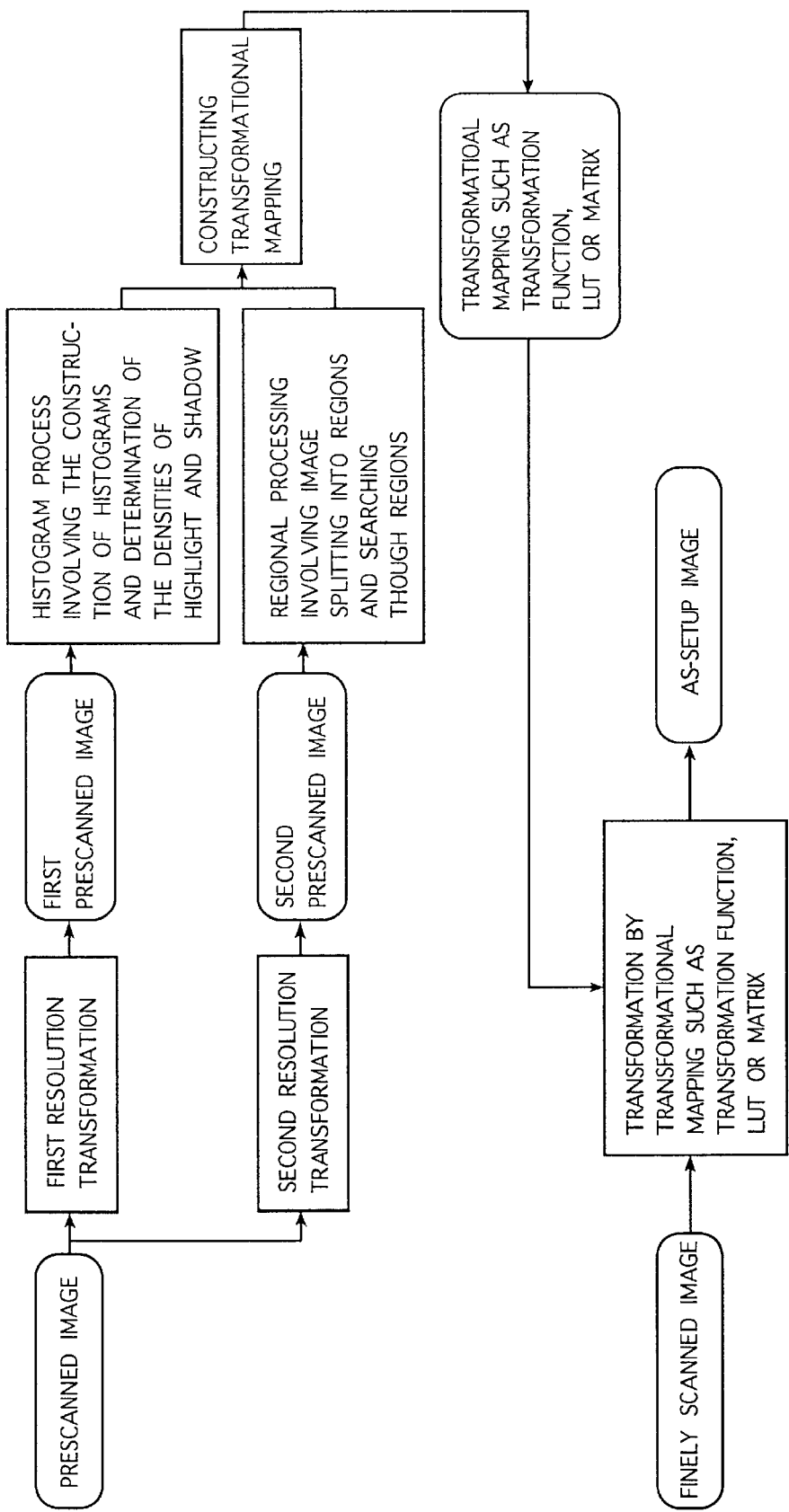
FIG. 1 is a flowchart illustrating an embodiment of the auto setup process of the invention.

The auto setup process of the invention will now be described with reference to the preferred embodiment shown in the accompanying diagram.

FIG. 1 is a flowchart illustrating an embodiment of the auto setup process of the invention. As shown, the auto setup process of the invention starts with performing a first resolution transformation on the prescanned image captured, that is, read out photoelectrically from an original image with an image reader such as a scanner. Thereby producing a first prescanned image of high resolution that has not been subjected to noise reduction is produced. The same prescanned image is also subjected to a second resolution transformation, thereby producing a second prescanned image of medium or low resolution that has been subjected to noise reduction.

The first prescanned image of high resolution is then used in a histogram process to construct density histograms, from which pieces of the information necessary for the auto setup procedure, such as the densities of highlights and shadows, are determined and, hence, the dynamic range of the image and other parameters.

The second prescanned image of medium or low resolution is used in regional processing. The image is split into regions and image regions are searched through to determine other pieces of the information necessary for the auto setup procedure, such as the representative and average values of the split regions and the image regions extracted as the result of searching.

Using the information for auto setup, such as the densities of highlights and shadows and the dynamic range, that have been obtained by the histogram process performed on the first prescanned image, as well as the information for auto setup, such as the quantitative image features like LATD, that have been obtained by the regional processing of the second prescanned image, auto setup operations are performed. This automatically sets a transformational mapping for setting up a finely-scanned image of the original image, for example, a transformation function, or a look-up table (LUT) representing the transformation function in a table form, or a transformation matrix representing the transformation function in a matrix form.

Using the thus set transformational mapping (i.e., transformation function, LUT or matrix), the finely-scanned image (data) can be transformed to produce an as-setup image (data). This completes the auto setup procedure.

The prescanned image shown in FIG. 1 which is yet to be subjected to the first and second resolution transformations is not subjected to noise reduction in the first resolution transformation prior to the histogram process. Hence, any pixel defects and other imperfections that are contained in the prescanned image will be directly introduced into the subsequent histogram process to compromise the exactness of the constructed histograms. To get around this problem, the prescanned image preferably is not the image data as captured with a scanner, but as corrected image data that has been corrected for the pixel defects or pixel sensitivity.

In the present invention, the histogram process is preferably performed on a prescanned image of the highest resolution. Therefore, the first resolution transformation to be performed on the prescanned image may be no processing or the "thinning-out" of pixels without noise reduction such as smoothing, which may be exemplified by simple thinning-out of pixels or the thinning-out of pixels in a checkerboard pattern. The resolution of the first prescanned image to result from the first resolution transformation is not limited to any particular value but may be set as appropriate for the size of the original image, the size of the output (reproduced) image, its resolution (pixel density) and the capability of the image processor that performs the auto setup procedure. If the image in a scene consists of 1280× 1000 pixels, an image consisting of from 320×250 to 640× 500 pixels may be captured as the prescanned image and the first prescanned image that results from the first resolution transformation may consist of from about 320×250 to about 640×500 pixels.

In the present invention, the regional processing is preferably performed on a prescanned image of medium or low resolution that has been subjected to noise reduction. Therefore, the second resolution transformation to be performed on the prescanned image along with noise suppression may be size reduction by the averaging of n×m pixels or median processing within an n×m mask size, where n and m may each range from 2 to 16. The resolution of the second prescanned image resulting from the second resolution transformation is not limited to any particular value, but may be selected as appropriate for various factors including the sizes and resolutions of the original image and the reproduced image, as well as the capacity and the cost of the image memory in the image processor that performs the regional processing and the required processing speed or time. If the image in a scene consists of 1280×1000 pixels as in the case described above in connection with the histogram process, the second prescanned image may consist of about 100×100 pixels, typically 106×83 pixels.

In the case shown in FIG. 1, the first and second prescanned images are produced by the first and second resolution transformations that are performed on the same prescanned image to render different resolutions. However, this is not the sole case of the invention and the same original image may be prescanned at least twice to produce different prescanned images, which are subsequently subjected to the required first and second resolution transformations to produce the first and second prescanned images. Alternatively and in a preferred case, the same original image may be prescanned at least twice with varying resolution to produce prescanned images of different resolutions, which are used as the first and second prescanned images either as such or after being subjected to the required first and second resolution transformations. If the prescanned image of the lower resolution is to be immediately used as the second prescanned image without any resolution transformation, the prescan step is preferably followed by only a noise reducing step without any transformation of the resolution. Such noise reducing step is not limited in any particular way and may be accomplished by smoothing through shift averaging of n×m pixels, specifically, 2×2 pixels.

In the illustrated case, the auto setup operations are performed on a prescanned image but this is not the sole case of the invention and any picture that has been read from the original image may substitute, as exemplified by a finely-scanned image. As in the case of the prescanned image but at different pixel thinning-out and size reduction ratios, the finely-scanned image is preferably subjected to either no processing or pixel thinning-out without the noise reducing effect in the first resolution transformation for the histogram process whereas it is subjected to the step of reducing the resolution (or size) along with noise reduction in the second resolution transformation for the regional processing. If the finely-scanned image in a scene consists of 1280×1000 pixels as in the case of the prescanned image, the pixels in one scene may simply be reduced to a quarter in both the vertical and horizontal directions to produce about 320×250 pixels in the first resolution transformation; in the second resolution transformation, the pixels in one scene may simply be reduced to a sixth in both the vertical and horizontal directions, then averaged within the area of 2×2 pixels and finally reduced by one half in both the vertical and horizontal directions to produce about 106×83 (=9298) pixels.

It should be noted here that the ratios by which the captured image is subjected to pixel thinning-out or size reduction in the first and second resolution transformations are not limited to any particular values and may be selected as appropriate for various factors including the size of the captured image, the capture resolution (pixel density), the size of the reproduced (output) image and its resolution (pixel density), as well as the capacity of the image memory in the image processor that performs auto setup operations and the required processing speed.

The histogram process to be performed in the invention is not limited in any particular way and, as already described above, density histograms, typically for three primary colors, may be constructed for use in determining the densities of highlights and shadows, as well as the dynamic range. Any other processing such as splitting of the image into clusters may also be performed insofar as it can provide the information necessary to perform the auto setup procedure on a captured image (finely-scanned image). Needless to say, any conventional processing techniques known in the art may be employed.

The regional processing to be done in the invention is not limited in any particular way; in the already described typical case, the image is split into regions or a particular image region is searched through and quantitative image features such as representative and average values (e.g. LATD) for the split regions or the region extracted by the searching are calculated. Any other processing such as pattern recognition, including an individual's recognition, and picture recognition may be performed insofar as they can provide the information necessary to accomplish the auto setup of the captured image (finely-scanned image). Needless to say, any conventional processing techniques known in the art may be employed.

In the present invention, various kinds of information as obtained by the histogram process and the regional processing, which in the illustrated case are quantitative image features such as the densities of highlights and shadows, the dynamic range, as well as the representative and average values for the split regions or the region extracted by searching, are used to perform auto setup operations. A transformation function, a transforming look-up table (LUT) or a transformation matrix is constructed as a transformational mapping for performing the auto setup of the captured image (finely-scanned image). However, this is not the sole case of the invention. The transformational mapping for auto setup may be calculated from the results of the histogram process and the regional processing as combined with the information obtained from other processing. It should also be noted that the transformational mapping to be determined by the auto setup operations in the invention is not limited to the transformation function, LUT or matrix but may be implemented in various other ways. The transformation function also is not limited to any particular type and may be a linear function or a higher-order function; the LUT also is not limited to any particular type and may be a one- or three-dimensional LUT; the matrix also is not limited to any particular type and may be a 3×3, 3×4 or 3×10 matrix.

Using the thus obtained transformational mapping for auto setup, one can transform the captured image (finely-scanned image) to produce an as-setup image. Since the transformational mapping is constructed on the basis of the information obtained from the images suitable for the specific contents and purposes of the auto setup operations, the precision and speed (efficiency) of the auto setup procedure performed on the basis of this transformational mapping can be reasonably enhanced.

While the auto setup process of the invention has the basics described on the foregoing pages, this is not the sole case of the invention and various improvements and design modifications can of course be made without departing from the spirit and scope of the invention.

As described above in detail, the present invention has the advantage of enhancing the precision of the auto setup procedure by using captured images, for example, prescanned images that are suitable for the respective auto setup operations.

The invention also permits the use of an image of medium or low resolution in the regional processing which is characterized by a marked increase or decrease in memory capacity and the amount of calculations in accordance with the volume of the data to be handled. As a result, the capacity of the image memory and the amount of calculations can be sufficiently reduced to increase the processing speed and, hence, shorten the processing time. In other words, the overall cost of the image processor that performs the auto setup procedure can be reduced.

What is claimed is:

1. A process for determining image processing conditions for processing an image, comprising:

performing a first scan of said image and generating a captured image;

constructing histograms from one of the captured image and the captured image subjected to a transformation at a first resolution;

processing regions of the captured image subjected to a transformation at a second resolution wherein the transformation at the first resolution has no noise reduction effect whereas the transformation at the second resolution has a noise reducing effect;

determining conditions for processing said image from the constructed histograms and processed regions; and processing a second scan of the image based upon the determined conditions.

2. The process according to claim 1, wherein the captured images at the first resolution from which said histograms are constructed have a relatively higher resolution than the captured images at the second resolution, the regions of which are processed.

3. The process according to claim 1, wherein said transformation at the first resolution includes one of thinning-out of pixels of the captured image and thinning-out of pixels of the captured image in a checkerboard pattern.

4. The process according to claim 1, wherein said transformation at the second resolution includes size reduction by one of averaging of n×m pixels of the captured image and median processing of the captured image within an n×m mask size.

5. The process according to claim 1, wherein said captured images are first scanned images obtained by capturing a relatively low resolution version of said image.

6. The process according to claim 1, wherein said captured images are corrected for at least one of pixel defects and pixel sensitivity.

7. The process according to claim 1, wherein said determined conditions for processing includes mapping information in the form of one of a transformation function, a look-up table and a transformation matrix.

8. The process according to claim 1, wherein said histograms are constructed of image data of one of the captured image and the captured image subjected to the first resolution and said histograms are constructed independent of said processed regions.

9. The process according to claim 1, wherein said first resolution is a relatively higher resolution than said second resolution.

10. The process according to claim 1, wherein said constructing said histograms are performed in parallel with said processing of regions.

11. The process according to claim 1, wherein all of said captured image is subjected to a transformation at a first resolution and a transformation at a second resolution.

12. The process according to claim 1, wherein all of said captured image is simultaneously subjected to a transformation at a first resolution and a transformation at a second resolution.

13. The process according to claim 1, wherein said conditions are determined by constructing transformational mapping from information combined from said histograms and said processed regions.

* * * * *